United States Patent [19]

Kirkwood et al.

[11] Patent Number: 4,973,145
[45] Date of Patent: Nov. 27, 1990

[54] FLEXURE MECHANISM

[75] Inventors: William J. Kirkwood, Prunedale; Russell P. Rhoads, Milpitas, both of Calif.

[73] Assignee: Lockheed Missiles & Space Company, Inc., Sunnyvale, Calif.

[21] Appl. No.: 287,242

[22] Filed: Dec. 21, 1988

[51] Int. Cl.⁵ .......................... G02B 7/18; F16D 3/00; F16H 21/54; G05G 11/00
[52] U.S. Cl. ..................................... 350/632; 350/487; 248/476; 74/99 R; 74/479
[58] Field of Search ............... 350/486, 487, 632, 321, 350/500, 637; 248/638, 476, 178; 74/99 R, 479; 901/21

[56] References Cited

U.S. PATENT DOCUMENTS

| | | | |
|---|---|---|---|
| 2,950,079 | 8/1960 | Horsfall | 248/638 |
| 3,215,391 | 11/1965 | Storm | 74/99 |
| 3,899,281 | 8/1975 | Jakobs | 248/638 |
| 3,928,778 | 12/1975 | Ivanov et al. | 350/487 |
| 4,616,906 | 10/1986 | Schweitzer | 350/486 |
| 4,714,214 | 12/1987 | Schleimann-Jensen et al. | 350/486 |
| 4,819,496 | 4/1989 | Shelef | 901/21 |
| 4,828,376 | 5/1989 | Padera | 350/500 |

FOREIGN PATENT DOCUMENTS

2511162 2/1981 France ............................ 248/178

Primary Examiner—Jon W. Henry
Attorney, Agent, or Firm—Rodger N. Alleman

[57] ABSTRACT

A flexure mechanism, the basic elements of which comprise a foundation plate, and a mounting plate which is desirably mounted generally parallel to the foundation plate and which is secured from the foundation plate by a series of flexible support elements, the support elements being secured to the foundation plate in a generally circular configuration and which incline conically, inwardly, into attachment to the mounting plate, also in a generally circular configuration. If the point of convergence of the support elements lies in the plane of the distal surface of the mounting plate, the foundation plate will move, in two degrees of freedom relative to the foundation plate much as if the two plates are pivotally connected to each other. The support elements may be adjustably mounted to the foundation plates and mounting plates, and means may be provided to move the mounting plate relative to the foundation plate.

15 Claims, 5 Drawing Sheets

FIG_1

FIG_2

FIG_3

FIG_5

FIG_4

FIG_6

FLEXURE MECHANISM

RIGHTS OF THE GOVERNMENT

The invention described herein may be manufactured and used by or for the Government of the United States for all governmental purposes without the payment of any royalty.

TECHNICAL FIELD

This invention falls generally within the technical field of mounting mechanisms and more specifically, is a flexural device whereby one element or foundation plate may be secured to a mounting plate in such manner as to provide a flexible (flexural) connection therebetween. The mechanism provides a method for mounting one such plate relative to another in such a manner that essentially no translation of the mounting plate in the X-Y plane is permitted relative to the foundation plate, and which at the same time accommodates a rotational movement within the X-Y plane and a relative movement along the Z axis of one plate relative to the other.

Various and numerous types of hinges, pivots, leverage mechanisms, gimbals and "universal" joints have heretofore been proposed, though we are not aware of any which allow the particular types of motional interrelationships achievable with this invention as above set forth.

Devices of varying nature and purpose may be envisioned utilizing the flexure mechanism of the instant invention. For example, to mount wheels to a vehicular structure with "springing" provided be an appropriate design of flexible support members. The mechanism may also be used to support reflective antennas of light or radio frequency energy.

Further, it is contemplated that a pair of the mechanisms mounted in mirror relationship, one to the other, would function as a joint, allowing rotational motion across (through) an angle.

BACKGROUND

The following four patents were cited in the patentability search conducted prior to filing the instant patent application:

(1) U.S. Pat. No. 4,533,219 issued Aug. 6, 1985 to Ralph E. Aldrich. This patent shows a resistive mat on which are mounted a series of actuators which in turn are attached to a reflective surface. Depending upon the voltage applied to the resistive matt, the actuators extend or contract, thus to adjust the "tilt" of the mirror.

(2) U.S. Pat. No. 4,171,876 issued Oct. 23, 1979 to Douglas E. Wood which shows in FIG. 7 a plurality of relatively rigid support structures inter-connecting a parabolic reflector standoff element which is part of the mounting mechanism for the structure.

(3) U.S. Pat. No. 1,578,958 issued Mar. 30, 1926 to Daoust, shows in effect, a parallelogram of forces mechanism in which a control disk 15 may be moved to remotely modify the position of a mirror 13 which is utilized in viewing objects under water.

(4) British Pat. No. 1,329,231 issued Sept. 5, 1973 to Phillip Brunker.

SUMMARY OF THE INVENTION

The invention herein described constitutes a flexure mechanism by which one element may be flexibly mounted relative to another so as to provide freedom of motion in four directions, three in a given plane, i.e., rotational motion along any axis in the X-Y plane and in a rotational mode about the Z axis, (the effect of which will be to cause a small motion of one plate relative to the other along their common Z axis).

It is, therefore, an object of the present invention to provide a mechanism which will allow the above noted motions of one element relative to the other.

It is a further object of the invention to provide support elements between a foundation plate and a mounting plate, adjustment of the effective lengths, or materials, or diameters of which will result in the modification of resistance to motion along axes as above described.

It is a further object of this invention to provide a suspension system which will maintain a pre-determined point location, i.e., with no translational motion within an X-Y plane while allowing rotation about the Z axis of that same reference coordinate system and resultant translation along the Z axis.

DESCRIPTION OF THE DRAWINGS

In the below referred to drawings, in which the same numerals denote like elements throughout.

DETAILED DESCRIPTION OF THE INVENTION

With the above objects, descriptions, and information in mind, the invention will now be described in detail by reference to the aforementioned Figures.

Figure 1:
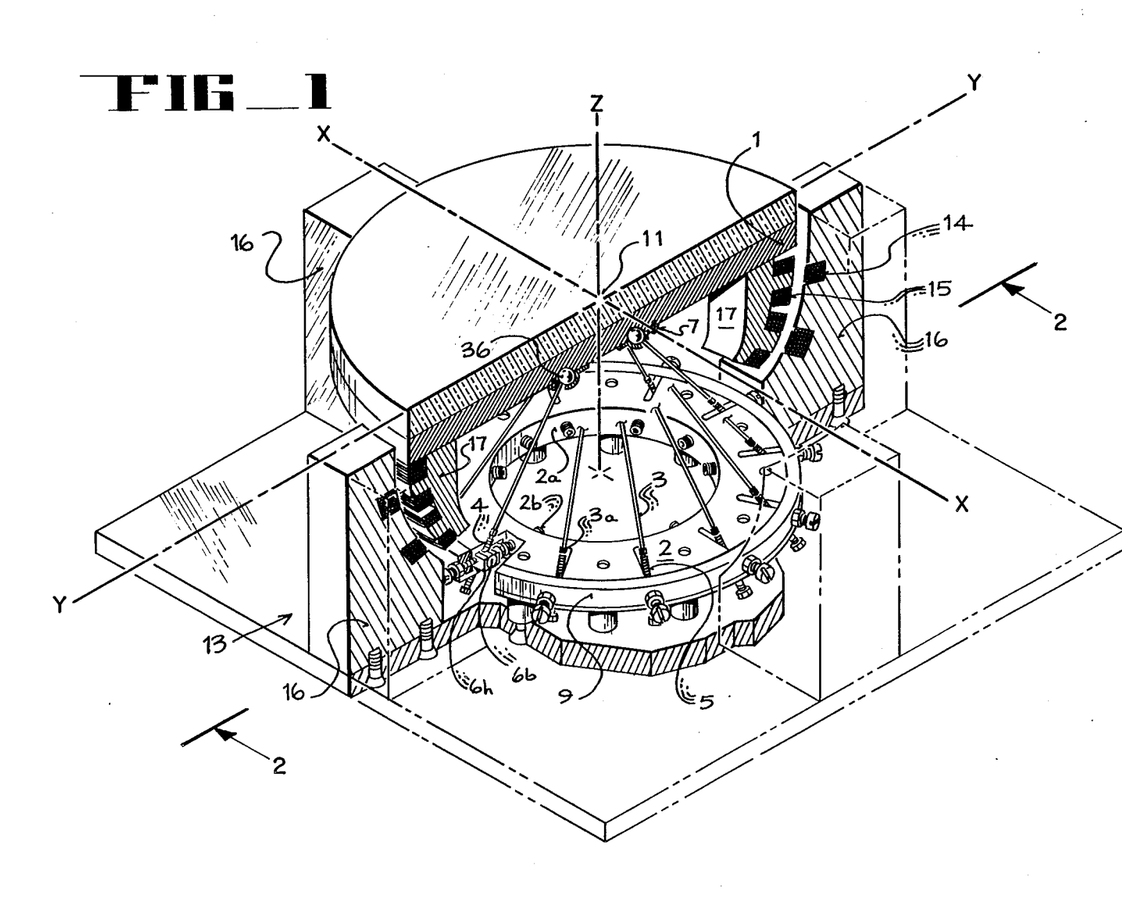
FIG. 1 is a three dimensional view of a flexure mechanism constructed in accordance with the teachings of the present invention.

Referring to FIG. 1, a flexure mechanism is shown in which a mounting plate 1 is flexibly secured to a foundation plate 2 by means of a plurality of support elements 3. Support elements 3 are preferably flexible, depending upon the requirements of a given application, and may be, for example, wires of stainless steel or other material. Support elements 3, shown more clearly in FIG. 2 may be adjustably mounted to mounting plate 1 and/or foundation plate 2 by having provided at either end thereof, attachment mechanisms which will be described. Thus, in foundation plate 2, adjustment sockets 4 are provided with integral threads which interrelate with threaded portions on flexible support elements 3. As adjusting nuts 6 rigidly secured to or integral parts of sockets 4 are utilized to turn adjustment sockets 4, the threads operate to draw flexible support elements 3 within or allow release from adjustment sockets 4. Embossments 3a secured to support elements 3 are adapted to be grasped by a suitable tool to prevent the support elements from turning as adjusting nuts 6 are turned.

Figure 3:
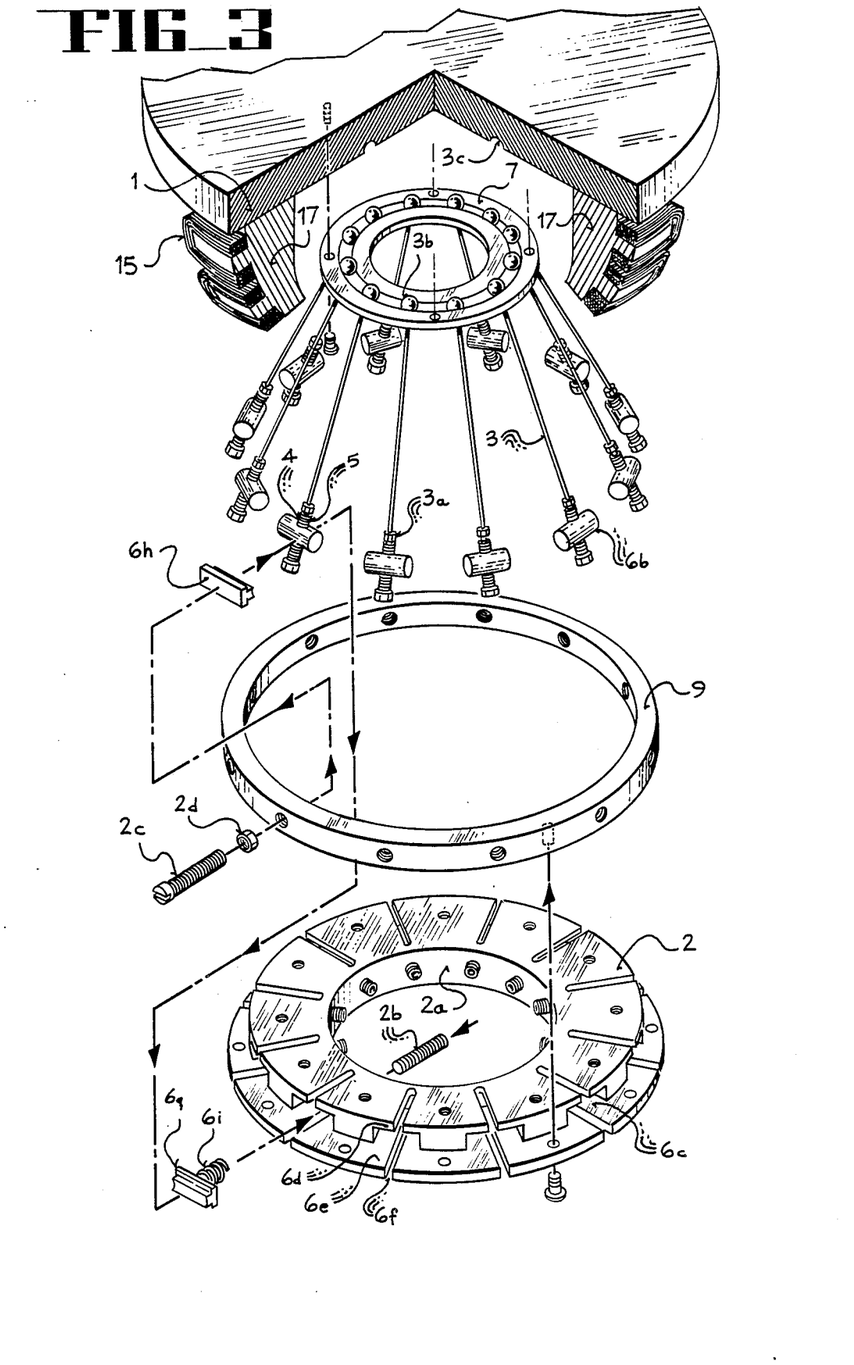
FIG. 3 is an exploded isometric view of the mechanism shown in FIG. 2.

Referring primarily to FIG. 3 adjustment sockets 4 are provided on their external surfaces with threads 5 which engage with complementary threads on the internal surface of holes bored through journal cylinders 6b. Journal cylinders 6b are adjustably journaled into foundation plate 2 by being placed in reception channels 6c (FIG. 3) which extend radially inwardly from the periphery of foundation plate 2. Reception channels 6c are partially defined by upper and lower surfaces 6d and 6e, respectively. Upper and lower surfaces 6d and 6e are provided with slots 6f which allow the ends of adjustment sockets 4 to extend through the respective upper and lower surfaces 6d and 6e. Slots 6f extend radially inwardly from the periphery of foundation plate 2 and accommodate the angular adjustment or movement of adjustment sockets 4 and support elements 3 in a manner to be described.

Adjustment sockets 4 are located between inner journal block 6g and outer journal block 6h both of which are adapted to slide within reception channels 6c. The faces of journal blocks 6g and 6h are rounded to accommodate a smooth interface with journal cylinders 6b.

As best seen in FIG. 3, foundation plate 2 is provided with a central aperture characterized by wall 2a through which are threadably mounted inner adjustment screws 2b, the outer faces of which impinge against inner journal blocks 6g. Springs 6i may be provided if desired between wall 2a and inner journal blocks 6g to urge journal cylinders 6b generally outwardly.

In a similar manner, outer journal blocks 6h have arcuate faces impinging against journal cylinders 6b and are adjusted radially inwardly by turning outer adjustment screws 2c. Adjustment screws 2b and 2c may be provided with end portions having slots, hex cavities or the like as desired. Outer adjustment screw 2c may be provided with a locking nut 2d to aid in fixing the position and limiting adjustment of outer adjustment screw 2c. Outer adjustment screw 2c is journaled in retaining ring 9 which surrounds the periphery of foundation plate 2 resting on the step provided by lower surface 6e of reception channels 6c.

Support elements 3 are secured to mounting plate 1 preferably adjustably, and while an adjustment mechanism similar to the described above in connection with foundation plate 2 may be provided, there is shown and described a system which allows support elements 3 to be flexibly journaled in the inner or lower surface of mounting plate 1. In this regard, the upper ends of support elements 3 are provided with generally spherical balls 3b which are adapted to be received in indentations 3c in the lower surface of mounting plate 1. The spherical balls 3b are adjustably held in place by a race 7 secured to the lower surface of mounting plate 1.

The use of sockets 4 allows the effective length of support elements 3 to be adjusted, and their angles of inclination to be changed without causing an added bending movement in the support elements 3 near the foundation plate.

Obviously, support elements 3 may be secured to foundation plate 2 and mounting plates 1 in other ways, e.g., welding, providing threads directly in one of the members, or the like as would accommodate the requirements of a given application. However, provision of the adjustment mechanism shown is convenient for ease of assembly, as well as ease of adjustment.

By utilization of the adjustment means provided, the flexure can be "tuned" or adjusted so that the point of convergence may be changed to effect a change in motions of the mounting plates in a manner to be described.

Assembly of the flexure is accomplished by inserting flexible support elements 3 through holes in race 7 which are considerably larger than the cross section of support elements 3, to accommodate movement of the support elements.

Race 7 is then secured to the bottom of mounting plate 1 in any suitable manner. Adjustment sockets 4 are then threadably engaged in journal cylinders 6b and then onto the threaded ends of support elements 3.

Figure 2:
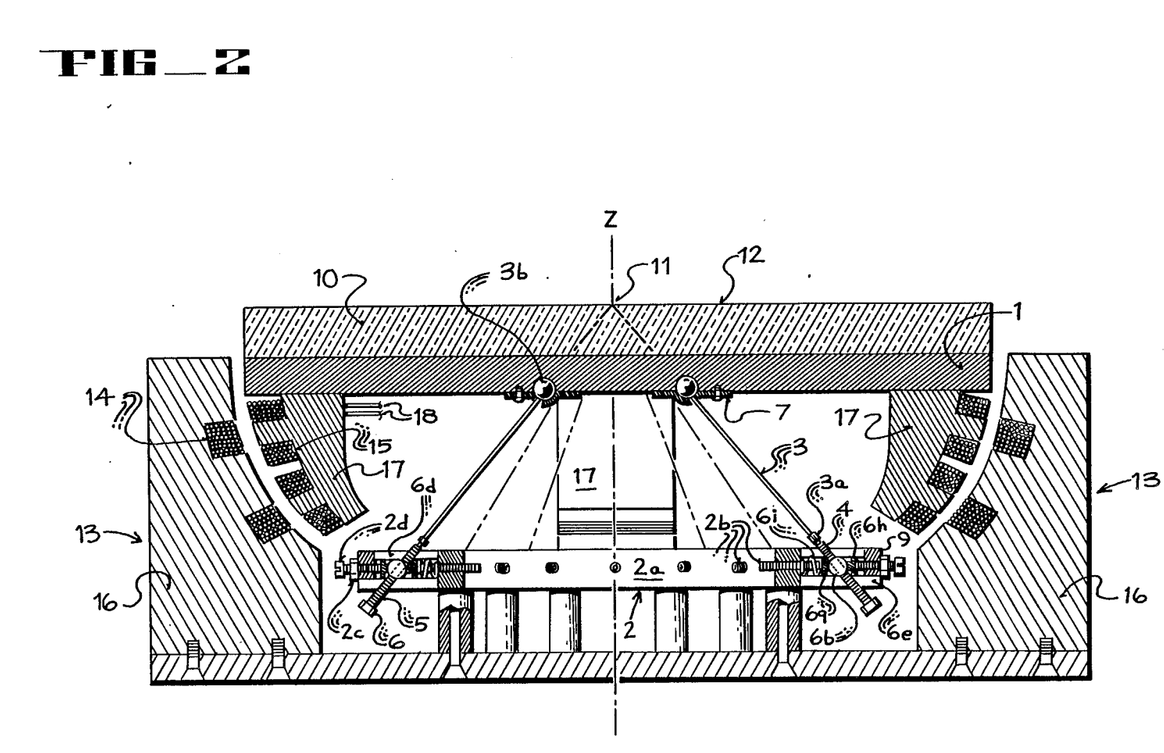
FIG. 2 is an elevational view taken along line 2—2 of FIG. 1.

Referring to FIG. 2, it is seen that journal cylinders 6b may be laterally adjusted by using adjustment screws 2b and 2c. A lateral movement radially outward would result in mounting plate 1 being drawn closer to foundation plate 2 (and point of convergence 11 would move below the surface 12 of operational member 10). This can be modified back to the original position by suitably grasping embossments 3a to prevent turning of support elements 3, while using adjusting nuts 6 to turn adjustment sockets 4.

As shown in FIG. 2, an operational member 10 may be provided and, as shown by the dotted lines in the body of operational member 10, the axis lines of support elements 3 converge in a point of convergence 11 which in this instance is an imaginary point on the surface of operational member 10. (If there is no operational member mounted on mounting plate 1, the thickness of mounting plate 1 may be increased to provide the same actions to be described.) In this configuration, with the point of convergence 11 being in the surface as described above, the outer or distal surface 12 of operational member 10 containing the point of convergence 11 will move relative to foundation plate 2 in four degrees of freedom, i.e., outer surface 12 will pivot about the imaginary pivot point constituting the point of convergence 11 in the X-Y plane. Additionally, outer surface 12, including operational member 10 and mounting plate 1 will rotate with respect to foundation plate 2, the axis of rotation being the common (Z) axis extending through the geometric centers of the "circles" constituting the points of connection of the support elements 3 to mounting plate 1 and foundation plate 2, respectively.

As the above described rotation takes place, it is inherent in the mechanism that mounting plate 1 will move toward foundation plate 2, the motion taking place along the common Z axis referred to above. Depending upon the degree of flexibility of support elements 3, release of the rotational force will cause the mounting plate 1 to return to its original "at rest" position thus, in effect, constituting a "spring".

As described above, if a non-rotative force is applied to mounting plate 1, i.e., a force applied in a plane containing the common (Z) axis of the plates, point of convergence 11 will remain stationary, but other points on the outer surface 12 of operational member 10 will move up or down, generally arcuately, toward or away from foundation plate 2. It has been found that this force may be made relatively quite small, depending upon the innate flexibility of support elements 3, and their angles of inclination relative to the Z axis so that an extremely free floating, pivital motion may be made to occur between foundation plate 2 and mounting plate 1.

To take advantage of this effect, various types of force applying mechanisms may be utilized. As shown, four pole pieces 13 which may be provided with electromagnetic windings 14 which interact with similar windings 15 associated with mounting plate 1. The application of electrical energy to windings 14 and 15 effectuates the desired motion, the extent of which is dependent upon the power applied and physical characteristics of the support elements. As shown in FIGS. 1 and 2 "stator" component 16 is formed to present an "E" core to the curved interface between the stator 16 and "rotor" 17. As electrical power is applied to stator 16 electromagnetic poles are formed, which interact with the poles on rotor 17 to cause force to be applied in a plane containing the Z axis of the flexure. It is noted that rotor 17 may be a permanent magnet or an electromagnet as dictated by the requirements of a particular application. If an electromagnet is selected, wires 18 would be routed to the outside of the flexure at the discretion of the designer. Polarities and strength of the magnets may be varied or reversed and controlled in each of the four pole pieces in accordance with standard, known methods to produce the motion desired in mounting plate 1. It is contemplated that other types of force exerting mechanisms, e.g., piezoelectric actuators, could be used.

Figure 5:
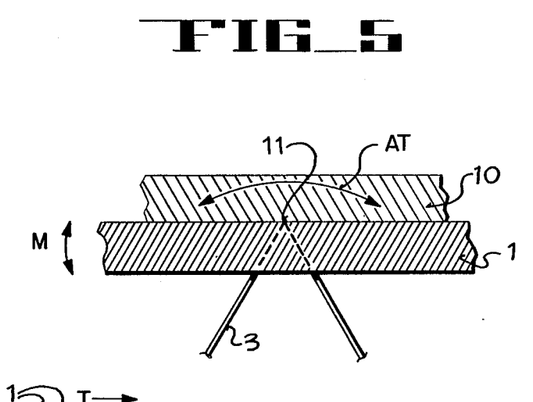
FIG. 5 is a similar schematic showing the effect of motion on an operational member where the point of convergence of the supports is located under an operational member mounted on the mounting plate.

FIGS. 1 and 2 show a mounting plate 1 upon which an operational member 10 (e.g. a reflective surface) has been secured having an outer (distal) surface 12. Obviously, mounting plate 1 itself could be made with a thickness to accommodate a point of convergence 11 being within the structure of the plate 1. Either alternative would in effect provide a mechanism with an operational mode essentially as schematically shown in FIG. 5. In this figure, the point of convergence 11 is on the upper surface of the mounting plate 1, and operational member 10 is positioned thereupon as described in FIG. 1 and 2. In this mode, exertion of a force in a plane containing the (Z) axis extending through the concentric points of attachment of the support elements 3 would, in addition to producing a motion depicted at "M", also produce an arcuate motion "AT" at all points distal to (above) the point of convergence whether such point was within mounting plate 1 or operational member 10, which motion would be accentuated at points toward outer surface 12.

Figure 4:
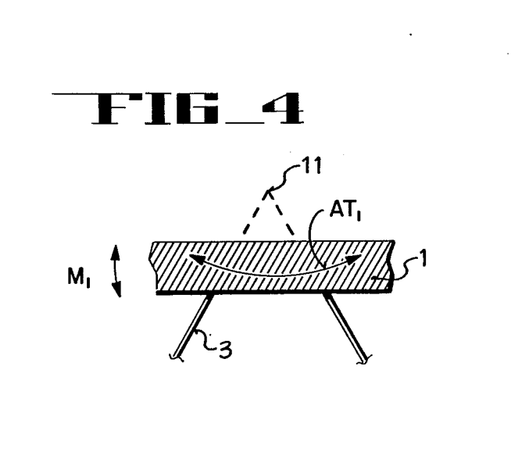
FIG. 4 is a schematic showing the effect of motion on the surface of a mounting plate if the point of convergence is an imaginary point above the face of the mounting plate.

In a somewhat similar manner, mounting support elements 3 in such a way that the point of convergence 11 is substantially above the surface of the mounting plate 1 as shown in FIG. 4 would, upon exertion of a force within the plane of the Z axis, produce a motion $M_1$ in mounting plate 1, which would, at the same time, result in an arcuate translation $AT_1$.

At this point, it is apropos to discuss in greater detail the points mentioned hereinabove regarding the effects of varying the mounting of support elements 3. Varying the flexibility of these elements will alter the "stiffness" or resistance to motion inherent in the flexure mechanism, and can be accomplished by varying the diameter of the support elements, their cross section, the material of which they are made, or their length. Stiffness can also be effected by varying the circles of attachment of support elements 3 to mounting plate 1 and foundation plate 2, e.g., (given a constant distance between the plates and the same location of the point of convergence) as the circles enlarge, the degree of stiffness decreases. Thus, the relative size of the circles of attachment will control inherent stiffness of the mechanism. Perhaps another way to describe this factor is to state that the angle of inclination of the support elements 3 with respect to the concentric axis extending through the circle of attachments will effect the stiffness discussed herein, with stiffness increasing as the circles are made smaller.

Figure 6:
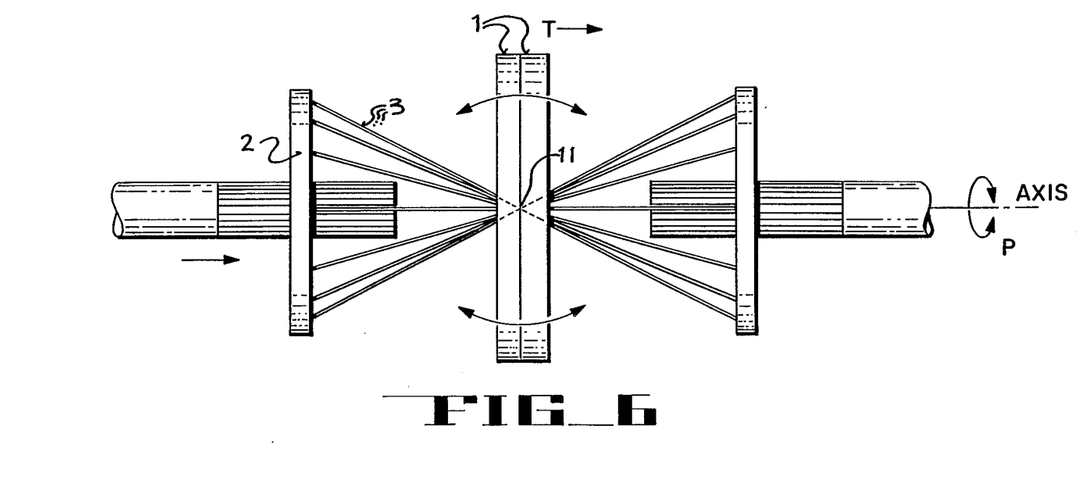
FIG. 6 is a plan view showing a pair of flexures and mounting plates mounted to each other, with a common axis extending through the support elements.

With respect to FIG. 6, a pair of flexural elements, as described in connection with FIGS. 1 and 2, but without any operating means have been secured together at their mounting plates such that the axes of each of the flexures are normally concentric, i.e., in the same line. It is assumed for this figure that there would be no operational element 10 included, and that the point of convergence 11 would be on the surface of the mounting plate 1 in each instance. If foundation plates 1 were splined to respective shafts to allow for resultant translation, one can envision that the double flexural mechanism as shown in FIG. 6 would constitute, in effect, a universal joint which could be utilized for the transmission of power. For example, if torsional power P were exerted through one of the foundation plates 2 as shown in the Figure, there would be a twisting of support elements 3, and a resultant translation T of mounting plates 1 along the line of the axis. This would, in effect, "pull" the two mounting plates 1 in the direction of translation T, moving the opposite foundation plate 2 in the same direction. Because of the flexural mount as herein described, the axis of one flexure could deviate angularly from that of the other flexure, thus allowing power and motion to be transmitted across the divergent axes. In keeping with the inherent functional features of the invention, there would be no translation of the mounting plates 1 in their X-Y planes with respect to foundation plates 2.

Also, in a single flexure, because of the non-translational characteristics in the X-Y plane at the surface of mounting plate 1 with respect to foundation plate 2, either of these plates should be attached to a torque source and the other plate would function as a wheel.

Figure 7:
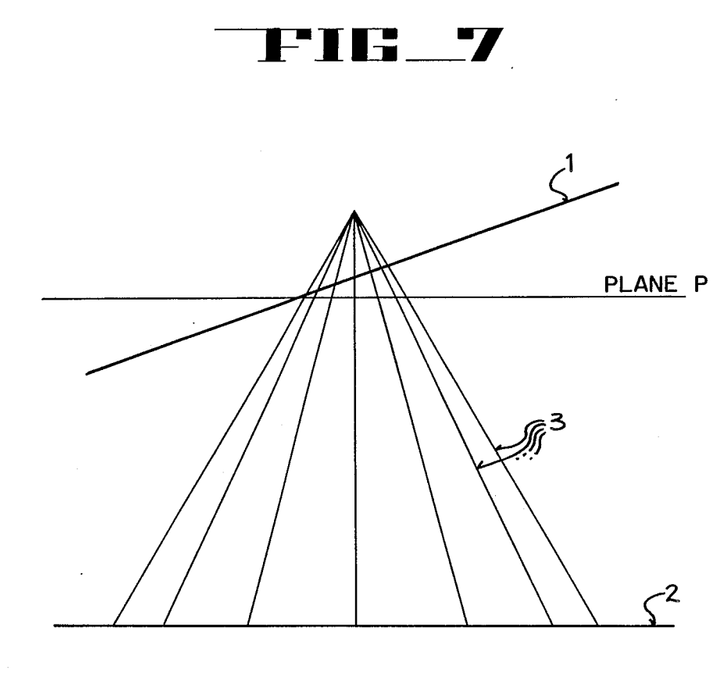
FIG. 7 is a schematic diagram showing a foundation plate and a mounting plate mounted in a non parallel relationship.

Referring to FIG. 7, it is contemplated within the bounds of the invention that mounting plate 1 does not have to be parallel in the "at rest" position with respect to foundation plate 2, i.e., as long as support elements 3 pass through a plane P parallel to the plane of the circle of attachment of the support elements 3 in foundation plate 1 thus to provide a concentric axis between the two plates, mounting plate 2 could be mounted angularly with appropriate extension of support elements 3 to accommodate such.

The foregoing description has been set forth to illustrate and describe the invention but is not intended to be limiting. Since modifications to the described embodiment incorporating the spirit and substance of the invention may occur to persons skilled in the art, the scope of the invention is specifically defined and is to be interpreted in accordance with the following claims.

We claim:

1. A flexure mechanism comprising
   a foundation plate,
   a mounting plate, and
   at least three flexible support elements interconnecting said plates for relative movement one to the other,
   said support elements being concentrically inclined about an axis extending through both said foundation and said mounting plates, the imaginary point of convergence of said support elements being outside the area between said plates.

2. A flexure mechanism as claimed in claim 1 in which the point of convergence of said flexible support elements lies within the distal surface of said mounting plate.

3. A flexure mechanism as claimed in claim 1 and in which the point of convergence of said support elements is within the thickness of said mounting plate.

4. A flexure mechanism as claimed in claim 1 and in which the point of convergence of said flexible support members is above the distal surface of said mounting plate.

5. A flexure mechanism as claimed in claim 1 and including an operational member mounted to the distal surface of said mounting plate, the point of convergence of said support elements being on the distal surface of said operational member.

6. A flexure mechanism comprising
a foundation plate,
a mounting plate, and
at least three flexible support elements interconnecting said plates for relative movement one to the other,
said support elements being concentrically inclined about an axis extending through both said foundation and said mounting plates, the imaginary point of convergence of said support elements being outside the area between said plates,
adjustment sockets in at least one of said plates in which said flexible support members are, respectively, adjustably secured, whereby the effective length of said flexible support members may be adjusted.

7. A flexure mechanism as claimed in claim 6 in which each of said adjustment sockets comprises
an elongated tubular shank, internal threads on the inner surface of said tubular shank engaged with complimentary threads on the ends of said support elements,
external threads on the exterior surface of said shank,
said foundation plate being provided with a central aperture defined by a wall,
reception channels extending radially inwardly from the periphery of said foundation plate, said reception channels including upper and lower surfaces,
slots in said upper and lower surfaces extending radially inwardly from the periphery of said foundation plate and adapted to receive, respectively, said support elements, and said shanks,
a journal cylinder moveably engaged in said reception channels,
said shanks extending through said journal cylinders and threadably journaled therein,
inner and outer journal blocks having arcuate portions impinging against said journal cylinders,
an inner adjustment screw threadably journaled through said wall and impinging against said inner journaled block,
a retaining ring positioned around the periphery of said foundation plate,
a plurality of outer adjustment screws threadably engaged in said retaining ring and extending inwardly into said reception channels and into contact with said outer journal blocks,
whereby, as said inner and outer adjustment screws are turned, said journal cylinders are moved in said reception channels to vary the angle of inclination of said support elements with respect to a common axis concentric to said mounting plate and said foundation plate.

8. A joint through which power may be angularly transmitted comprising
a pair of flexure mechanisms as claimed in claim 2 connected together at the distal surface of their mounting plates,
and in which the point of convergence of the flexible support elements of each flexure is a common point.

9. A flexure mechanism as claimed in claim 1 and which includes control means for controlling the position of said mounting plate relative to said foundation plate.

10. A flexure mechanism comprising
a foundation plate,
a mounting plate, and
at least three flexible support elements interconnecting said plates for relative movement one to the other,
said support elements being concentrically inclined about an axis extending through both said foundation and said mounting plates, the imaginary point of convergence of said support elements being outside the area between said plates, and which includes control means for controlling the position of said mounting plate relative to said foundation plate, said control means comprising at least three electromagnets positioned equidistantly about said axis.

11. A flexure mechanism comprising
a foundation plate,
a mounting plate, and
at least three flexible support elements interconnecting said plates for relative movement one to the other,
said support elements being concentrically inclined about an axis extending through both said foundation and said mounting plates, the imaginary point of convergence of said support elements being outside the area between said plates, and which includes control means for controlling the position of said mounting plate relative to said foundation plate, said control means comprising at least three piezo-electric elements equidistantly positioned about said axis and between said mounting plate and said foundation plate.

12. A reflective mirror and mounting mechanism therefore comprising
a foundation plate,
a mounting plate, and
at least three flexible support elements interconnecting said plates,
adjustable sockets in at least one of said plates in which the ends of said support elements are adjustably secured,
a mirror having a reflective surface mounted on the distal surface of said mounting plate,
said flexible support elements being concentrically inclined about an axis extending through both said plates,
the point of convergence of said support elements being in said reflective surface,
and control means inter-relating said foundation plate and said mounting plate for controlling the position of said plates relative to each other.

13. A flexure mechanism as claimed in claim 1 and in which the planes containing the surfaces of said mounting plate and said foundation plate, respectively, are divergent.

14. A flexure mechanism comprising a foundation plate, a mounting plate, and at least three flexible support elements inter-connecting said plates for relative movement, one to the other, said support elements being concentrically inclined about an axis extending through both said foundation and said mounting plates, means attaching said support elements to said foundation plate to accommodate adjustment of the effective length of said support elements, and means for modifying the angle of inclination of said support elements with respect to said axis.

15. A flexure mechanism as claimed in claim 14 wherein said flexible support elements are each rotatably journaled in the lower surface of said mounting plate.

* * * * *